United States Patent
Steibel et al.

(10) Patent No.: US 6,280,550 B1
(45) Date of Patent: Aug. 28, 2001

(54) FABRICATION OF COMPOSITE ARTICLES HAVING AN INFILTRATED MATRIX

(75) Inventors: James D. Steibel; Kenneth P. Onderko, both of Hamilton, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/210,856

(22) Filed: Dec. 15, 1998

(51) Int. Cl.$^7$ ............................................. B32B 31/12
(52) U.S. Cl. ......................... 156/182; 156/212; 156/305
(58) Field of Search ..................... 156/89.11, 89.22, 156/89.23, 89.25, 89.26, 188, 190, 191, 192, 173, 171, 212, 305, 182

(56) References Cited

U.S. PATENT DOCUMENTS

| | | | |
|---|---|---|---|
| 4,396,663 | * | 8/1983 | Mitchell et al. . |
| 4,722,762 | * | 2/1988 | Luhleich et al. . |
| 4,741,873 | * | 5/1988 | Fisher et al. . |
| 4,762,269 | * | 8/1988 | Gyarmarti et al. . |
| 4,921,554 | * | 5/1990 | Bates et al. . |
| 5,015,540 |   | 5/1991 | Borom et al. ............... 428/698 |
| 5,067,999 | * | 11/1991 | Streckert et al. . |
| 5,080,851 | * | 1/1992 | Flonc et al. . |
| 5,112,545 | * | 5/1992 | Spain et al. . |
| 5,196,120 | * | 3/1993 | White . |
| 5,296,311 | * | 3/1994 | McMurtry et al. . |
| 5,330,854 | * | 7/1994 | Singh et al. . |
| 5,336,350 |   | 8/1994 | Singh .......................... 156/155 |
| 5,350,545 | * | 9/1994 | Streckert et al. . |
| 5,436,042 | * | 7/1995 | Lau et al. . |
| 5,474,635 | * | 12/1995 | Jacob et al. . |
| 5,480,603 | * | 1/1996 | Lopez et al. . |
| 5,866,060 | * | 2/1999 | Buckley . |
| 5,893,955 | * | 4/1999 | Rousseau et al. . |
| 5,922,628 | * | 7/1999 | Barton et al. . |
| 5,942,064 | * | 8/1999 | Krenkel et al. . |
| 5,980,669 | * | 11/1999 | Maumus et al. . |
| 6,030,575 | * | 2/2000 | Barron et al. . |
| 6,106,650 | * | 8/2000 | Cheshire . |

OTHER PUBLICATIONS

Fabrication of Ceramic–Ceramic Composites by Chemical Vapor Deposition by DP Stinton, WJ Lackey, RJ Lauf, and TM Besmann, Oak Ridge Natl Laboratory pp. 668–676.

* cited by examiner

*Primary Examiner*—Curtis Mayes
(74) *Attorney, Agent, or Firm*—Andrew C. Hess; David L. Narciso

(57) ABSTRACT

A composite article is fabricated by preparing a porous first region piece having a first reinforcement material with no matrix, and rigidizing the first reinforcement material to form a porous first coated preform. At least one second-region layer of a second reinforcement material having no matrix is applied in contact with at least a portion of the first coated preform. The second reinforcement material is rigidized, to form a second coated preform. A second-region matrix material is deposited into at least some of the porosity of the second coated preform. The reinforcement material may be silicon carbide fibers, and the infiltrated matrix may be silicon carbide.

17 Claims, 4 Drawing Sheets

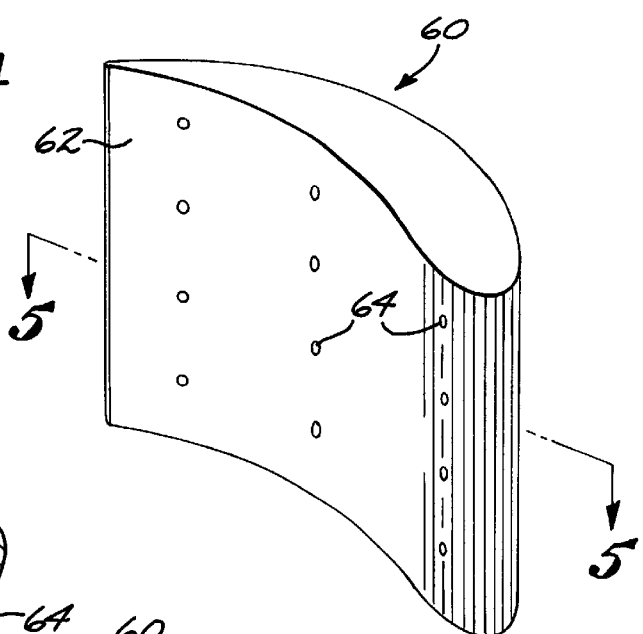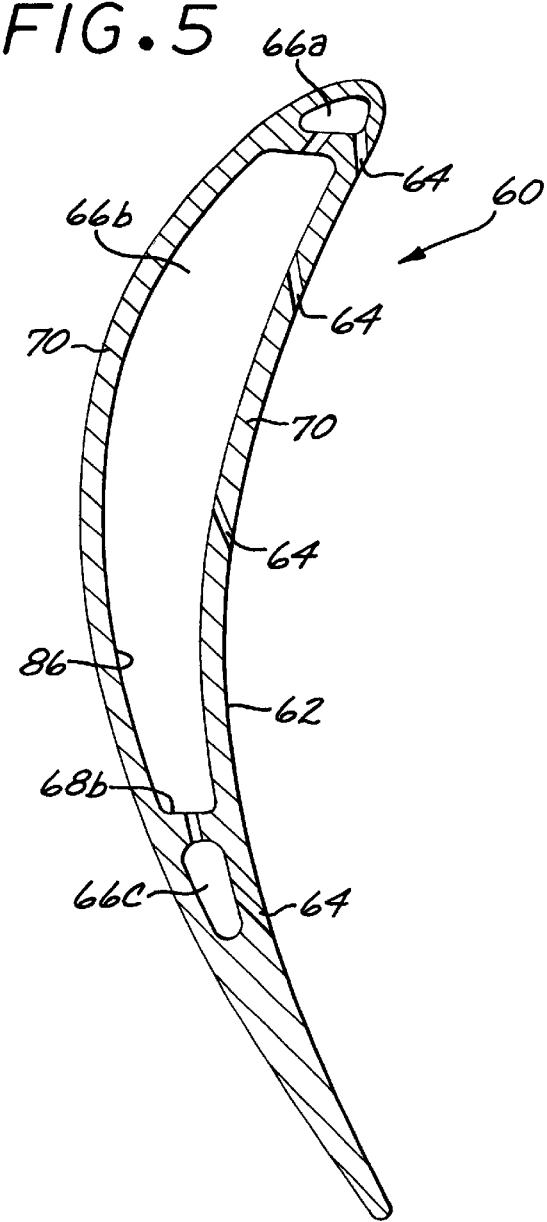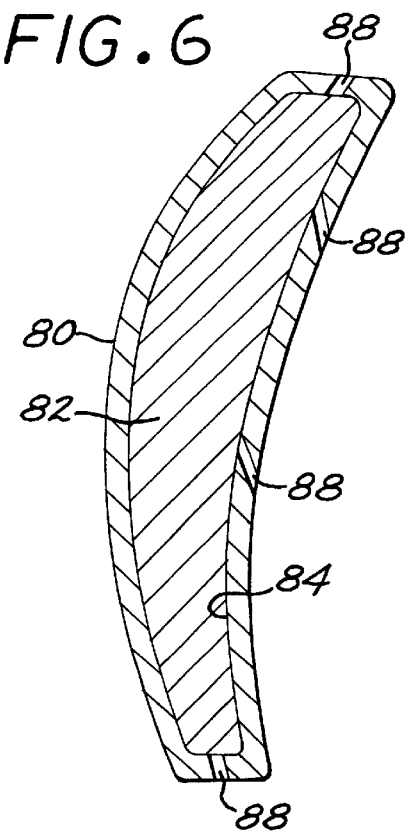

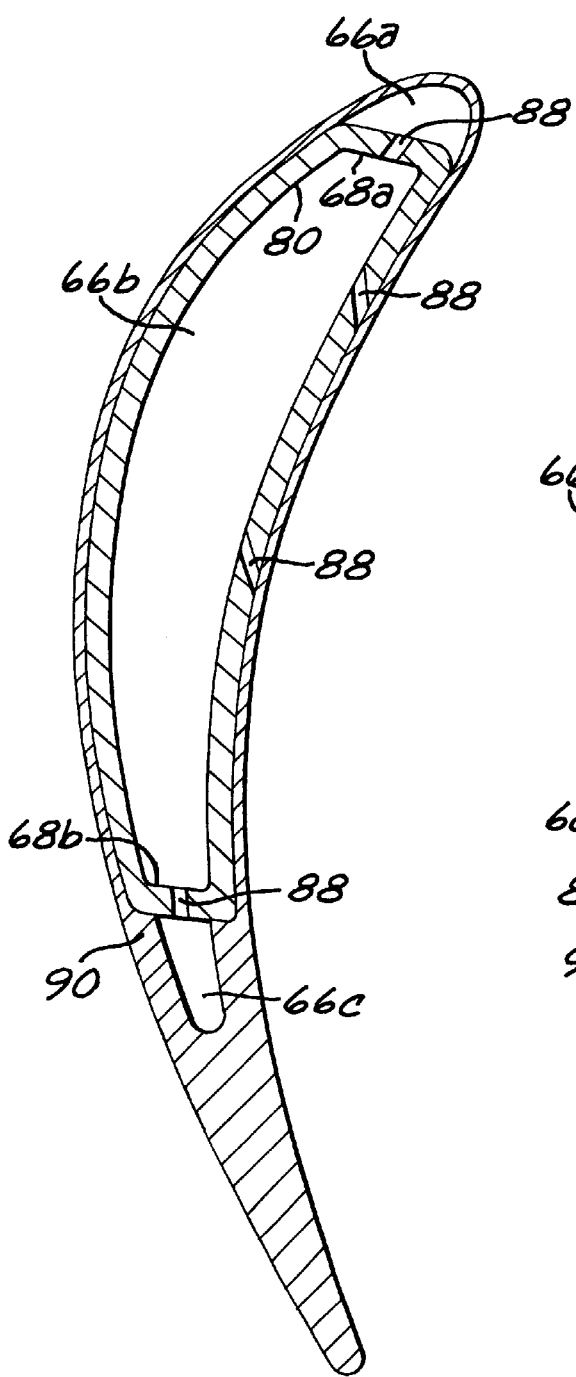
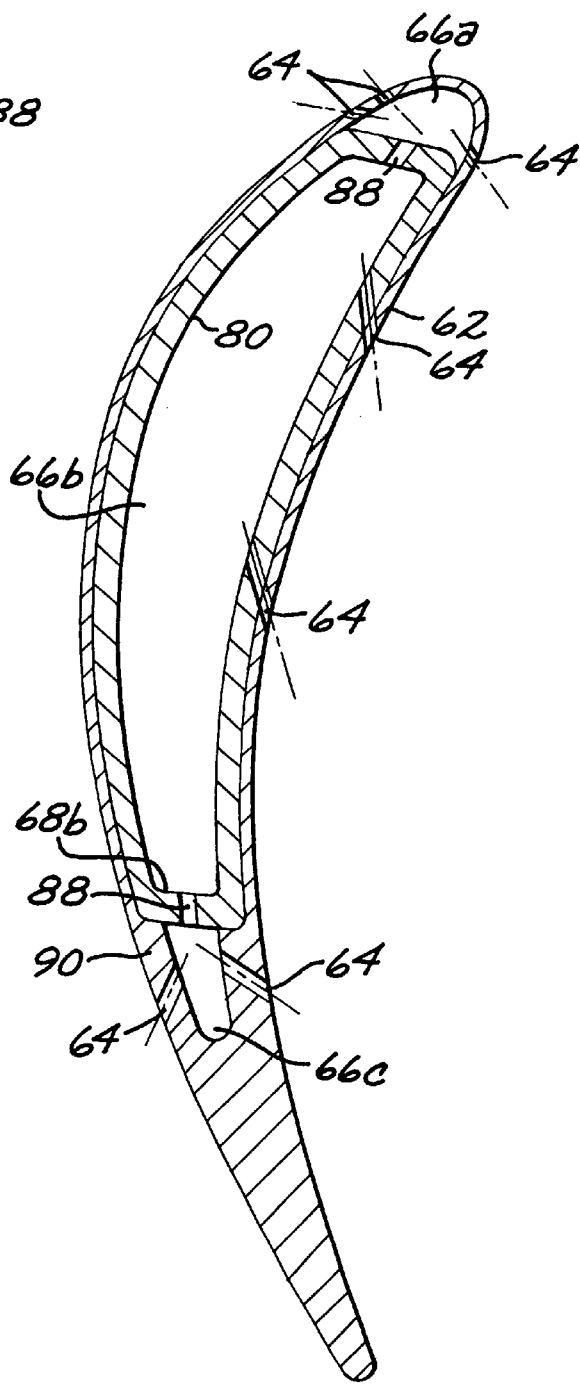

FABRICATION OF COMPOSITE ARTICLES HAVING AN INFILTRATED MATRIX

The invention hereindescribed was made in the course of or under a contract or subcontract thereunder (or grant) with the Department of the Navy.

BACKGROUND OF THE INVENTION

This invention relates to the fabrication of composite articles, and, more particularly, to the fabrication of such articles using a fibrous ceramic reinforcing material that is infiltrated with a ceramic matrix material.

In an aircraft gas turbine (jet) engine, air is drawn into the front of the engine, compressed by a shaft-mounted compressor, and mixed with fuel. The mixture is combusted, and the resulting hot exhaust gases are passed through a turbine mounted on the same shaft. The flow of gas turns the turbine, which turns the shaft and provides power to the compressor. The hot exhaust gases flow from the back of the engine, driving it and the aircraft forwardly.

The hotter the exhaust gases, the more efficient is the operation of the jet engine. There is thus an incentive to raise the exhaust gas temperature. However, the maximum temperature of the exhaust gases is normally limited by the materials used to fabricate the turbine vanes and turbine blades of the turbine. In current engines, the turbine vanes and blades are made of nickel-based superalloys and can operate at temperatures of up to 1900–2100° F.

Many approaches have been used to increase the operating temperature limit of the turbine blades and vanes. The compositions and processing of the materials themselves have been improved. Physical cooling techniques are used. In one widely used approach, internal cooling channels are provided within the components, and cool air is forced through the channels during engine operation.

In another approach, ceramic or ceramic composite materials have been used to fabricate some of the hot section components. Most ceramics have very limited fracture toughness, and therefore ceramic composite materials have been considered for such structures. A ceramic composite material of current interest is silicon carbide fibers embedded in a silicon carbide matrix. In one approach, articles are fabricated by collating silicon carbide fibers on a tool, rigidizing the silicon carbide fibers to form a coated preform, and then producing a silicon carbide matrix in the coated preform by chemical vapor deposition (i.e., chemical vapor infiltration) or melt infiltration.

While operable for the fabrication of many articles, the present inventors have recognized that the current manufacturing process has shortcomings when used in the fabrication of other articles. For example, if the article is quite thick, the production of the matrix is slow or may not be possible. Some hollow articles and articles containing cooling channels, such as turbine blades or vanes, cannot be readily prepared by the conventional procedure.

There is a need for an improved approach to the fabrication of composite articles to allow greater flexibility in the preparation of complex and thick sections. The present invention fulfills this need, and further provides related advantages.

SUMMARY OF THE INVENTION

The present invention provides a method for the fabrication of composite articles, and articles prepared by the method. This approach allows the fabrication of significantly thicker articles than possible with conventional procedures. Articles with corners that require doublers at the interior side of the corner may be prepared. Hollow articles with multiple internal cooling passages and externally connecting orifices may be fabricated more easily than with the conventional approach. The finished articles are sound and of high quality throughout.

In accordance with the invention, a method for fabricating a composite article comprises the steps of preparing a porous first region piece comprising a first reinforcement material having no matrix, and thereafter rigidizing the first reinforcement material to form a porous first coated preform. The method further includes applying at least one second-region layer of a second reinforcement material having no matrix in contact with at least a portion of the first coated preform, and thereafter rigidizing the second reinforcement material, to form a second coated preform. A second-region matrix material is deposited into at least some of the porosity of the second coated preform. The reinforcement material is preferably silicon carbide fiber, and the matrix material preferably comprises silicon carbide, either polycrystalline silicon carbide, or a mixture of polycrystalline silicon carbide and silicon.

The present approach may be used to fabricate solid (i.e., not hollow) articles or hollow articles such as turbine components with internal cooling passages and externally connecting cooling orifices. In one embodiment of this approach, the first coated preform is hollow, defining one internal passage, and/or the second-region layer of the second reinforcement material may contact some, but not all, of the outer periphery of the first coated preform. In another embodiment, to make a hollow article with an internal rib defining a second large internal passage, a third coated preform is made and assembled with the first coated preform. Both the first and third coated preforms are overlaid with the second reinforcement material, and the matrix material is infiltrated to form the shell of the hollow article. With the prior approach, it is quite difficult to fabricate an article having an internal rib.

Optionally, a first-region matrix material may be deposited into at least some of the porosity of the first coated preform after the step of rigidizing the first reinforcement material and before the step of applying at least one second-region layer. This allows a progressive infiltration of the matrix material, or the use of a different matrix material. The thickness of some articles made by the prior approach is limited by the ability to infiltrate the matrix material into the porosity of the fibrous coated preform, and the present approach overcomes that limitation so that thicker articles may be made than heretofore possible.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 4 is a perspective view of a hollow composite low pressure turbine blade;

FIG. 5 is a schematic sectional view of the turbine blade of FIG. 4, taken along line 5—5, as made by a conventional approach;

FIG. 6 is a schematic sectional view, taken along line 5—5, of a first coated preform used in fabricating the turbine blade of FIG. 5;

FIG. 7 is a schematic sectional view, taken along line 5—5, of the first coated preform and overlying second reinforcement material used in fabricating the turbine blade of FIG. 5;

FIG. 8 is a schematic sectional view, taken along line 5—5, of the final turbine blade fabricated by the present approach.

DETAILED DESCRIPTION OF THE INVENTION

Figure 1:
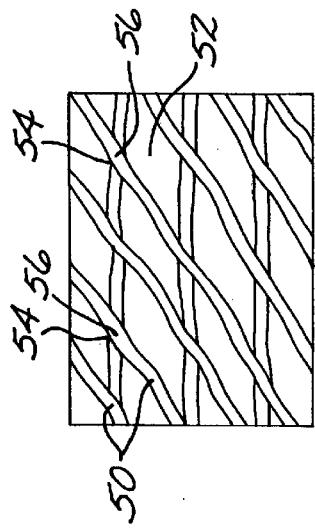
FIG. 1 is a side elevational view of an article with a sharp corner and a reinforcing doubler.

FIG. 1 depicts a composite article 20 in the form of two panels joined at a relatively sharp corner, numeral 22, with a reinforcing doubler 24 on the interior side of the sharp corner. This article 20 may be difficult or impossible to fabricate from some materials, such as a composite material of silicon carbide (SiC) fibers within an infiltrated polycrystalline silicon carbide matrix. The difficulty may arise both from the geometry of the positioning of the doubler 24 on the interior side of the sharp corner, and from the difficulty in infiltrating silicon carbide matrix material through the total thickness of the article 20 in the region of the doubler 24.

Figure 2:
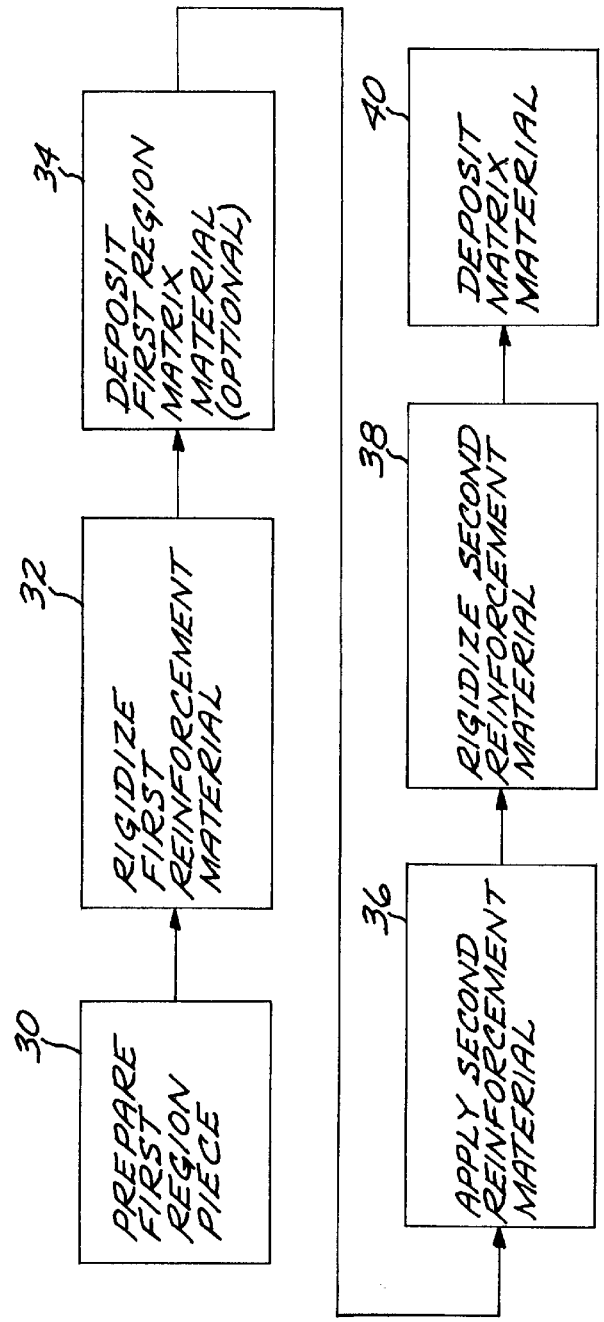
FIG. 2 is a block diagram of a preferred approach for fabricating an article according to the present invention.

FIG. 2 is a block diagram of an approach for fabricating articles by the approach of the invention, such as the article 20 of FIG. 1, and other articles as will be discussed subsequently. The method will be described here in relation to the article 20, but is not so limited. A first-region piece is first prepared, numeral 30. In this case, the first-region piece has the shape of the panels and corner 22. It is formed of a first reinforcement material with no matrix material present. The reinforcement material is preferably ceramic fibers, most preferably silicon carbide fibers. The silicon carbide fibers may be unidirectional or cross-plied two dimensionally, in one or more layers, or even furnished in a three-dimensional arrangement. In one embodiment, the silicon carbide fibers are furnished as a single two-dimensional layer of woven cloth, termed a "ply". Typically, several plies are collated together to provide the desired thickness of the first-region piece, usually on appropriate tooling that defines the shape of the first-region piece.

Figure 3:
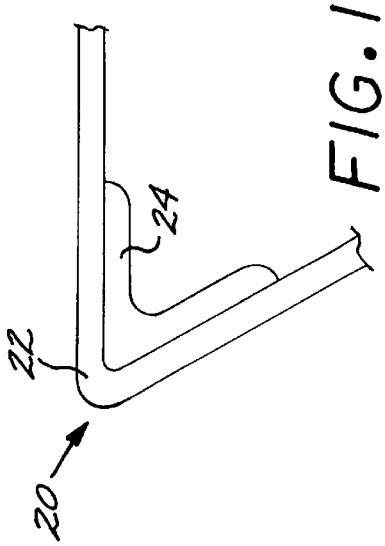
FIG. 3 is a schematic sectional view of the microstructure of the article of FIG. 1.

The first reinforcement piece is rigidized, numeral 32. In the initial first-region piece prepared in step 30, the reinforcement fibers are free to move relative to each other by small amounts, which permits the plies of the first-region piece to be collated but prevents easy handling of the first-region piece. In the rigidizing step 32, a bonding material is applied to the reinforcement fibers at their points of contact to transform the first-region piece into a relatively rigid structure. As shown in FIG. 3, in the preferred approach the reinforcing fibers 50 are present in a weave with porosity 52 therebetween at this stage. At a later stage, the porosity is filled with a matrix material. In the rigidizing step 32, the bonding material 54 is applied to the reinforcing fibers 50, so that, at their points of contact 56 with neighboring reinforcing fibers, they are bound together. In a preferred rigidizing process, a thin layer of boron nitride is first deposited into the porous first-region piece, so that it coats the reinforcing fibers 50, both generally and at the points of contact 56. Silicon carbide is thereafter deposited overlying the boron nitride, both generally and at the points of contact 56. The deposited boron nitride and silicon carbide are the bonding material 54 at the points of contact 56 of the reinforcing fibers 50. The result, as depicted in FIG. 3, is a bonded structure, known as a first coated preform, that has sufficient rigidity to be handled in subsequent processing, although its mechanical properties are not sufficient for service applications. The deposition of the boron nitride and silicon carbide layers are preferably accomplished by chemical vapor deposition (CVD), which, in this application, is often termed chemical vapor infiltration (CVI). This deposition technique is well known, see, for example, D. P. Stinton et al., "Fabrication of Ceramic-Ceramic Composites by Chemical Vapor Deposition", *Ceramic Engineering Science Proceedings*, Vol. 5 {7–8}, pages 668–676 (1984).

Optionally, a first-region matrix material is deposited into the porosity 52 of the first coated preform, numeral 34. For many articles the matrix material may be deposited in a single step, to be described subsequently as step 40. That approach is preferred, because for some articles it is less time consuming to perform a single deposition step than two deposition steps. However, in some cases the final structure is too thick or complex to permit deposition of the matrix for the entire article in one step. The practical value of the thickness limit of the part for successful deposition of the matrix depends on several factors, such as the arrangement of the fiber reinforcement, the volume fraction of the fiber reinforcement (i.e., the amount of open space between the fibers during deposition of the matrix), the geometry of the part, the required composition of the matrix, and the method used to deposit the matrix. Therefore, no single firm value may be stated, but upper thickness limits are observed for matrix deposition for each particular combination of variables. For a final part having a high fiber volume fraction of about 40 percent or cross-woven fibers, the practical maximum part thickness for chemical vapor infiltration is about ⅛ inch and the practical maximum part thickness for melt infiltration is about ¼–1 inch.

A virtue of the present sequential fabrication process is that it permits components to be infiltrated with the matrix material at intermediate stages, in this case in optional step 34, so that thicker parts may be prepared and also parts of configurations not possible with the conventional approach. Another advantage is that the matrix material introduced into the first coated preform may be different than that used in other portions of the structure, although in most cases the same matrix material is used throughout. The procedure used in this optional step 34 is the same as that used in step 40, which subsequent description is incorporated here.

At least one second-region layer of a second reinforcement material is applied to the first coated preform (or infiltrated first coated preform if step 34 is employed), numeral 36. The second reinforcement material is preferably the same type of material as the first reinforcement material, although the present approach permits the use of a different second reinforcement material. In the preferred case, the second reinforcement fiber material is provided as a plies of a two-dimensional weave of reinforcement fibers, most preferably silicon carbide fibers. The plies are applied to the surface of the first coated preform (or infiltrated first coated preform if step 34 is used), so that they contact at least a portion of the surface of the first coated preform. In the article of FIG. 1, the plies of the second reinforcement fibers are applied to the inner surface of the panels and corner 22, near to the inner surface of the corner material, in the region that will eventually be the reinforcing doubler 24.

The newly applied second reinforcement material is rigidized, numeral 38. The rigidizing step 38 is performed by the same approach as the rigidizing step 32, which discussion is incorporated here. The resulting porous structure is termed a second coated preform. It has a microstructure like that of FIG. 3, which description is incorporated here. The second coated preform includes the reinforcement material applied in step 36, and also the reinforcement material applied earlier in the process but not previously infiltrated with matrix material.

A second-region matrix material is deposited into at least some of the porosity of the second coated preform, numeral 40. The second-region matrix material is preferably silicon carbide, deposited in a polycrystalline form into the porosity, or a mixture of silicon and polycrystalline silicon carbide. Deposition of the matrix material may be accomplished by any operable approach that allows the matrix material to be infiltrated into the porosity of the coated preform. One technique is to deposit the matrix material by chemical vapor deposition, using essentially the same approach as in the rigidizing steps 32 and 38. In another approach, the matrix material is deposited by melt infiltration. In one method, a slurry of carbon, carbon-containing resin, or other carbonaceous material, and, optionally, silicon carbide particulate, is introduced into the porosity, and molten silicon is thereafter infiltrated into the remaining space to react with the carbonaceous material to form silicon carbide. The amount of silicon may be stoichiometric, so that the matrix is silicon carbide. An excess of silicon may instead be used, so that the final structure is a mixture of reacted silicon carbide and unreacted silicon. In a typical case of the latter embodiment, the silicon carbide:silicon weight ratio ranges from about 95:5 to 50:50. Examples of deposition processes, often generally termed Silcomp processes, are disclosed in U.S. Pat. Nos. 5,015,540; 5,330,854; and 5,336,350, whose disclosures are incorporated by reference.

At least some of the matrix material of the first region may be deposited in the optional step 34. It is preferred, however, that at least some of the matrix material of the first region also be deposited during the deposition step 40, so as to provide a bonding between the first region and the second region.

The resulting article 20 comprises a composite material structure, with silicon carbide fibers embedded in a silicon carbide matrix in the preferred embodiment. The article may be made thicker than is possible with conventional fabrication technology, as discussed above.

The present approach also permits the fabrication of complex composite articles which are difficult or impossible to fabricate by conventional fabrication technology. FIG. 4 depicts a component article of a gas turbine engine such as a turbine blade or turbine vane, and in this illustration a hollow composite low pressure turbine vane 60 that is to be fabricated. The turbine vane 60 includes an airfoil 62 against which the flow of hot exhaust gas is directed. The turbine vane 60 is hollow for reduced weight and to provide a channel for a flow of cooling air to pass through the interior of the turbine vane and exit through orifices 64 in the surface of the airfoil 62. In operation, a flow of cooling air is directed through the cooling channel and out the orifices 64, to reduce the temperature of the airfoil 22.

FIG. 5 is a sectional view of the turbine vane 60 of FIG. 4. The turbine vane 60 is hollow, with three channels 66a, 66b, and 66c through which cooling air flows axially through the turbine vane 60 to exit at the orifices 64. The use of three channels 66a, 66b, and 66c is desirable in order to achieve the proper pressure distribution and flow through the various orifices 64. To define the three channels 66a, 66b, and 66c, the hollow interior of the turbine vane is divided by two through-thickness ribs 68a and 68b extending between the outer walls 70 of the turbine vane 60. The outer walls 70 of the turbine vane 60 may be fabricated as a silicon carbide fiber/silicon carbide matrix composite material using conventional technology. However, it is difficult or impossible to form the ribs 68 using the conventional approach, because the rib portion of the coated preform cannot be readily produced, and because the rib-portion of the coated preform could not be readily infiltrated with the matrix material in any event.

Such a complex article as the turbine vane 60 may be fabricated using the present approach, following the procedure generally illustrated in FIG. 2, whose description is incorporated here. An insert 80, depicted in FIG. 6, is prepared as the first region piece in step 30. The insert 80 is prepared by collating first reinforcement material onto a piece of tooling in the shape of a mandrel 82. In the preferred case, plies of silicon carbide fabric are collated onto the mandrel. The mandrel 82 is selected so that the insert 80 has an inner surface 84 whose shape and size defines an inner surface 86 of a portion of the final article, specifically the channel 66b of FIG. 5. While on the mandrel, the first reinforcement material is rigidized, numeral 32, yielding the coated preform. The porous coated preform has sufficient strength and rigidity to be processed at this stage, as by machining openings 88 that are required to communicate the air flow to the orifices 64 in the final article.

After the coated preform is complete, the mandrel 82 is removed by a physical, chemical, or thermal process. For example, the mandrel 82 may be machined out of the interior of the insert 80, or may be dissolved, etched away, or vaporized, depending upon its material of construction.

Optionally, matrix material may be deposited into the porosity of the insert coated preform, numeral 34.

The second reinforcement material is applied overlying the insert coated preform, step 36. In the preferred case, the second reinforcement material is additional plies of silicon carbide fabric, as described previously. The total thickness of the article at any location is the sum of the thickness of the insert and the overlying material. The total thickness of material required by strength considerations is allocated between the insert and the overlying material in the design process, with typically about half the total number of plies in the insert 80 and half in the overlying material.

The second reinforcement material may be applied so as to contact all of the insert 80, or so as to contact only a portion of the surface of the insert 80. By applying the second reinforcement material so as to contact only a portion of the surface of the insert, and bowing the second reinforcement material outwardly to define the surface shape of the airfoil 62, the hollow interior of the article may be subdivided to define the channels 66a, 66b, and 66c. The ends of the insert 60 thereby define the ribs 68a and 68b, as shown in FIG. 7.

The second reinforcement material is rigidized, step 38. The resulting second coated preform, shown in FIG. 7, includes the coated preform region of the insert 80, and a coated preform region of a shell 90 of the rigidized second reinforcement material overlying the insert 80. The shape and thickness to which the second reinforcement material was applied in step 36 defines the shape and size of the airfoil 62 of the turbine vane 60.

Matrix material is deposited into the porosity of the second reinforcement material and, if step 34 was not performed or performed so as to fill only a portion of the porosity of the first coated preform, into the porosity of the first reinforcement material, step 40. The preferred silicon carbide or silicon/silicon carbide matrix material is deposited as described previously.

The fabrication of the turbine vane 60 is completed by final machining, such as the drilling of the orifices 64 aligned with the openings 88 or fine machining the exterior surface of the shell 90 so as to achieve a precise size and shape for the airfoil. The final machining may be performed either before or after the deposition step 40, as may be appropriate for particular final machining operations. The final fabrication may also include removing any stray matrix material and general cleaning.

Figure 9:
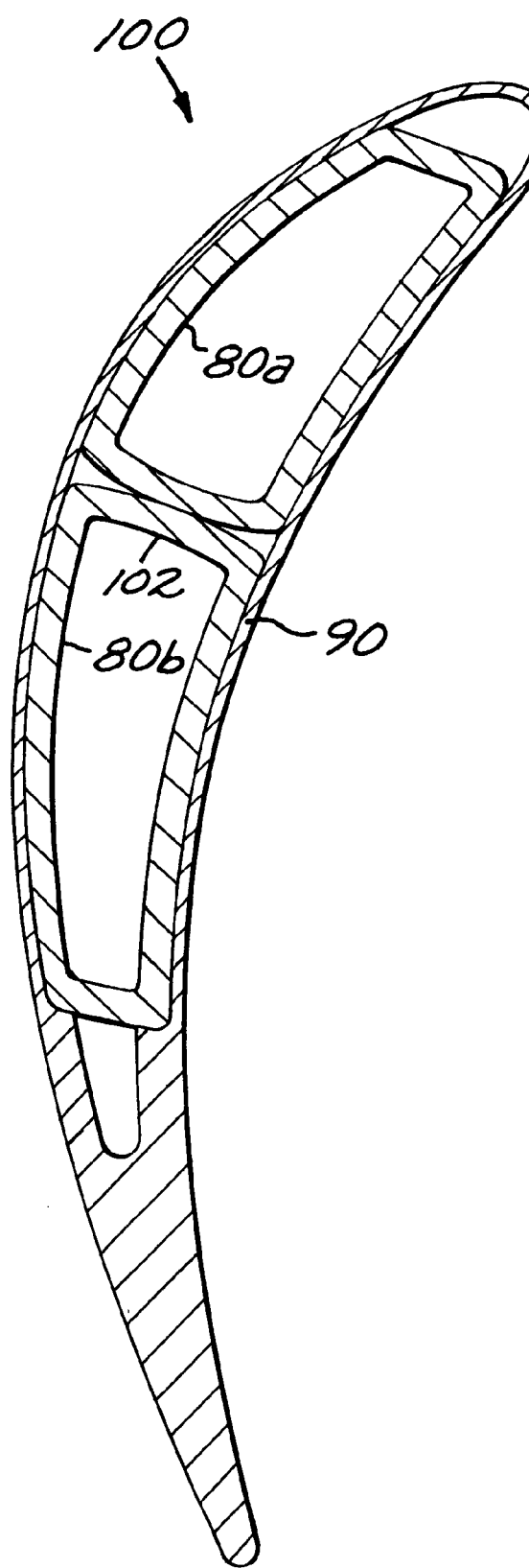
FIG. 9 is a schematic sectional view of a second embodiment of a turbine blade fabricated by the present approach.

FIG. 9 illustrates an even more complex turbine vane 100, wherein the hollow interior is divided into four channels rather than three channels, and including an additional transverse rib, to achieve a different distribution of the cooling air flow and more structural strength in the final turbine vane. The fabrication of this turbine vane 100 is similar to that of the turbine vane 60, and the prior discussion is incorporated here. In this case, however, two inserts 80*a* and 80*b* are prepared and positioned together so as to form a central transverse rib 102 that further subdivides the hollow interior of the turbine vane 100 and provides additional structural strength.

An airfoil section has been prepared using the approach of the invention. The microstructure of this section was good, with a fully dense matrix and the various coatings and layers uniform. Optional step 34 was not employed in this prototype.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for fabricating a composite article which is a portion of a gas turbine engine, comprising the steps of:
   preparing a porous first-region piece comprising a first reinforcement material having no matrix; thereafter
   rigidizing the first reinforcement material to form a porous first coated preform; thereafter
   applying at least one second-region layer of a second reinforcement material having no matrix in contact with at least a portion of the first coated preform; thereafter
   rigidizing the second reinforcement material, to form a second coated preform; and thereafter
   depositing a second-region matrix material into at least some of the porosity of the second coated preform to produce the composite article of the second reinforcement material embedded in the second-region matrix material, wherein the composite article is a portion of a gas turbine engine.

2. The method of claim 1, wherein the first reinforcement material and the second reinforcement material are silicon carbide fibers.

3. The method of claim 1, wherein the matrix material comprises silicon carbide.

4. The method of claim 1, including an additional step prior to the step of applying at least one second-region layer, of
   preparing a porous third region piece comprising a third reinforcement material having no matrix; and thereafter
   rigidizing the third reinforcement material to form a porous third coated preform, and
   wherein the step of applying at least one -second-region layer includes the step of
   applying at least one second-region layer of a second reinforcement material having no matrix in contact with at least a portion of the first coated preform and at least a portion of the third coated preform.

5. The method of claim 1, wherein the first coated preform is hollow.

6. The method of claim 1, wherein a channel is left between the first coated preform and the at least one second-region layer of a second reinforcement material.

7. The method of claim 1, wherein the step of preparing a porous first piece includes the step of
   placing the first reinforcement material onto a mandrel.

8. The method of claim 7, wherein the step of applying at least one second-region layer includes the step of
   applying the second reinforcement material so as to contact a portion of the first coated preform, but not to contact a second portion of the first coated preform.

9. The method of claim 1, wherein the composite article is hollow.

10. A method for fabricating a composite article which is a portion of a gas turbine engine, comprising the steps of:
    providing a mandrel whose outer surface defines at least a portion of an inner cavity surface of the article;
    applying at least one insert layer of a first reinforcement material overlying the mandrel;
    rigidizing the first reinforcement material to form a porous first coated preform;
    removing the mandrel from the first coated preform;
    applying at least one shell layer of a second reinforcement material overlying the first coated preform to form a porous shell;
    rigidizing the second reinforcement material; and
    depositing a matrix material into the porosity of the porous first coated preform and the porous shell to produce the composite article of the first reinforcement material and the second reinforcement material embedded in the matrix material, wherein the composite article is a portion of a gas turbine engine.

11. The method of claim 10, including the additional steps, prior to the step of applying at least one shell layer, of
    providing a second mandrel whose outer surface defines at least a second portion of an inner cavity surface of the article;
    applying at least one insert layer of a third reinforcement material overlying the second mandrel;
    rigidizing the third reinforcement material to form a porous second coated preform; and
    assembling the first coated preform and the second coated preform together, and wherein the step of applying at least one shell layer includes the step of
    applying the at least one shell layer over the first coated preform and the second coated preform.

12. The method of claim 10, wherein the first reinforcement material and the second reinforcement material are silicon carbide fibers.

13. The method of claim 10, wherein the matrix material comprises silicon/carbide.

14. The method of claim 10, wherein the step of applying at least one shell layer includes the step of applying the second reinforcement material so as to contact a portion of the first coated preform, but not to contact a second portion of the first coated preform.

15. A method for fabricating a composite article, comprising the steps of:

preparing a porous first-region piece comprising a first reinforcement material having no matrix; thereafter rigidizing the first reinforcement material to form a porous first coated preform; thereafter depositing a first-region matrix material into at least some of the porosity of the first coated preform to form an infiltrated first coated preform; thereafter applying at least one second-region layer of a second reinforcement material having no matrix in contact with at least a portion of the infiltrated first coated preform; thereafter rigidizing the second reinforcement material, to form a second coated preform; and thereafter depositing a second-region matrix material into at least some of the porosity of the second coated preform.

16. The method of claim 15, wherein the first-region matrix material and the second-region matrix material are the same material.

17. The method of claim 15, wherein the composite article is a portion of a gas turbine engine.

* * * * *